United States Patent [19]
Williams

[11] Patent Number: 6,088,026
[45] Date of Patent: Jul. 11, 2000

[54] METHOD AND APPARATUS FOR MULTIMEDIA INFORMATION ASSOCIATION TO AN ELECTRONIC CALENDAR EVENT

[75] Inventor: Marvin L. Williams, Lewisville, Tex.

[73] Assignee: International Business Machines Corporation, Armonk, N.Y.

[21] Appl. No.: 08/173,287

[22] Filed: Dec. 21, 1993

[51] Int. Cl.[7] .................................................. G06F 17/30
[52] U.S. Cl. .......................................... 345/302; 707/501
[58] Field of Search .................................. 395/154–157, 395/159, 161; 345/302; 707/501

[56] References Cited

U.S. PATENT DOCUMENTS

| | | | |
|---|---|---|---|
| 5,251,314 | 10/1993 | Williams | 364/419.1 |
| 5,261,045 | 11/1993 | Scully et al. | 395/161 |
| 5,299,304 | 3/1994 | Williams et al. | 395/148 |
| 5,307,086 | 4/1994 | Griffin et al. | 395/155 |
| 5,319,382 | 6/1994 | Fitzpatrick et al. | 345/118 |
| 5,323,314 | 6/1994 | Baber et al. | 395/155 |

*Primary Examiner*—Stephen S. Hong
*Attorney, Agent, or Firm*—Norman L. Gundel

[57] ABSTRACT

A method and system which permits a user to selectively capture video and audio information from a multimedia presentation within a data processing system and associate the audio and video information to specified calendar events. Thereafter, the video and audio information is played back within the context of electronic calendar events. In addition, associated textual references may be made with the video and audio information to elaborate on the audio and video information associated to the calendar events.

16 Claims, 6 Drawing Sheets

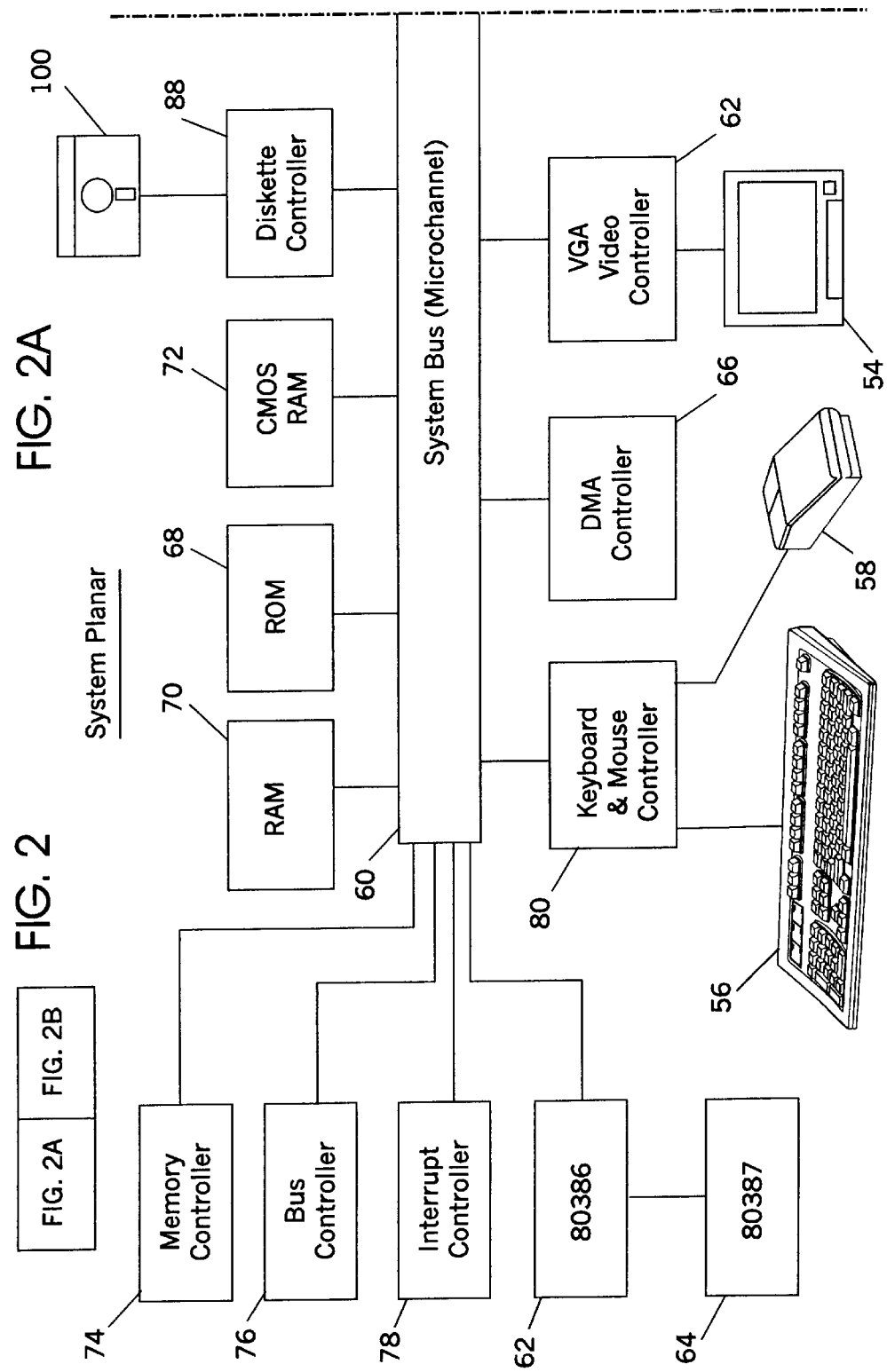

METHOD AND APPARATUS FOR MULTIMEDIA INFORMATION ASSOCIATION TO AN ELECTRONIC CALENDAR EVENT

BACKGROUND OF THE INVENTION

1. Field of the Invention

The present invention relates in general to data processing systems and in particular to capturing an audio or video session in a data processing system. Still more particularly, the present invention relates to associating selected segments of a multimedia presentation of a data processing system to an electronic calendar event.

2. Background of the Invention

The manipulation of data in a data processing system is well known. Data may be manipulated in many ways, including: data accessing, data encoding, data communications, data compression, data conversion, data entry, data exchange, data filing, data linking, data locking, data manipulation, data mapping, data modeling, data recording, data sorting, and data transferring.

The large amounts of data that are available to the user of a data processing system may become overwhelming in magnitude and complexity. Individuals are often performing tasks of categorization of data and determining appropriate associations for referencing data.

Data processing systems may be capable of communicating information to individual users in many information formats, including: text, graphics, sounds, animated graphics, synthesized speech, and video. Multimedia presentations may include full motion video presentations displayed within the data processing system. Multimedia conferencing employs a data processing system to combine multiple information formats into a coherent and comprehensive presentation to interactive communication between individuals. Data processing systems capable of multimedia conferencing may include video-telephones, electronic teleconferencing devices and other devices capable of transmitting video and audio media simultaneously.

Data processing systems may manage and schedule time based characteristics of tasks and events. Such managing and scheduling systems are commonly known as electronic calendar applications. A data processing system may be linked to a telephone or another form of a communication line. The electronic transfer of information between two or more entities is a communication session. A person, called a user, operating the data processing system, may for example, during a video conference session, see or hear information he desires to associate and integrate with an electronic calendar event. An electronic calendar event is defined as a point in time or range of time designated for a specific task. Additionally, a caller may read a postal address or display a picture to an office user over a video telephone device. Typically, entering information from an electronic communication session is achieved by manual cut-and-paste techniques. The information may exist in a medium not compatible with the user's current data processing system, such as an image and audio information derived from a video telephone device.

There is a desire to associate video and audio segments of an electronic communication session with data processing applications so that automatic capture of segments can be incorporated as references to invoke applications, such as icons, and as visual and audio references within an electronic calendar application.

SUMMARY OF THE INVENTION

It is therefore one object of the present invention to provide an improved data processing system.

It is another object of the present invention to provide an improved method and system in a data processing system for associating a video image to an electronic calendar event.

It is another object of the present invention to provide an improved method and system in a data processing system for associating a digital audio pattern to an electronic calendar event.

It is yet another object of the present invention to provide an improved method and system in a data processing system for activation of multimedia information associated to a calendar event.

In accordance with the present invention, a method and data processing system are disclosed for associating electronic calendar events with selected segments from multimedia presentations. In one embodiment, the invention captures a multimedia presentation segment and allows a user to associate the image or audio or combination of image and audio as a reference to a specific electronic calendar event.

The foregoing objects are achieved as is now described. The present invention permits a user to selectively capture a display of a full motion video presentation within a data processing system, wherein the full motion video presentation is comprised of a number of frames containing picture elements arranged in rows and columns. The video presentation frames are sequentially displayed within the data processing system. In addition, audible portions of the presentation also may be captured with or without the full motion video presentation. Thereafter, segments of interest within each of a selected number of frames of the full motion video presentation are designated. The picture elements contained within each of the selected frames within the region of interest are stored along with any captured audible occurrences. Then, the picture elements from the region of interest within the plurality of frames may be independently associated to an electronic calendar event.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF PREFERRED EMBODIMENT

Figure 1:
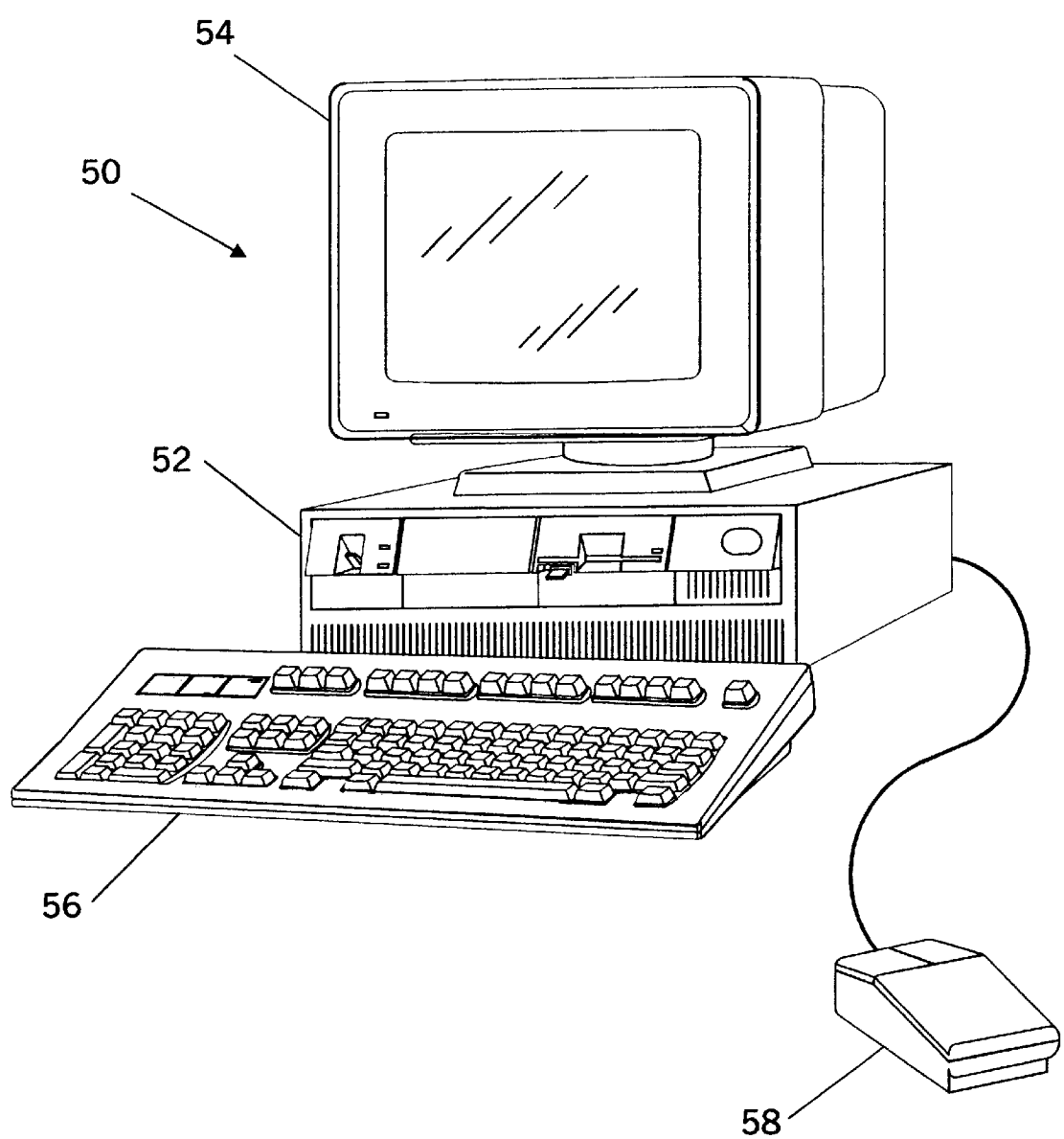
FIG. 1 is a pictorial representation of a data processing system that may be utilized to implement a method and system of the present invention.

With reference now to the figures and in particular with reference to FIG. 1, there is depicted a pictorial representation of a data processing system in which a preferred embodiment of the method of the present invention may be implemented. A personal computer 50 is depicted which includes a system unit 52, a video display monitor 54, a keyboard 56, and a mouse 58. Personal computer 50 may be implemented utilizing any suitable computer such as an IBM PS/2 computer, a product of IBM Corp., located in Armonk, N.Y. "IBM" and "PS/2" are registered trademarks of IBM Corp. Although the depicted embodiment involves a personal computer, the present invention may be implemented in other types of data processing systems, such as, for example, intelligent work stations or mini-computers.

Figure 2B:
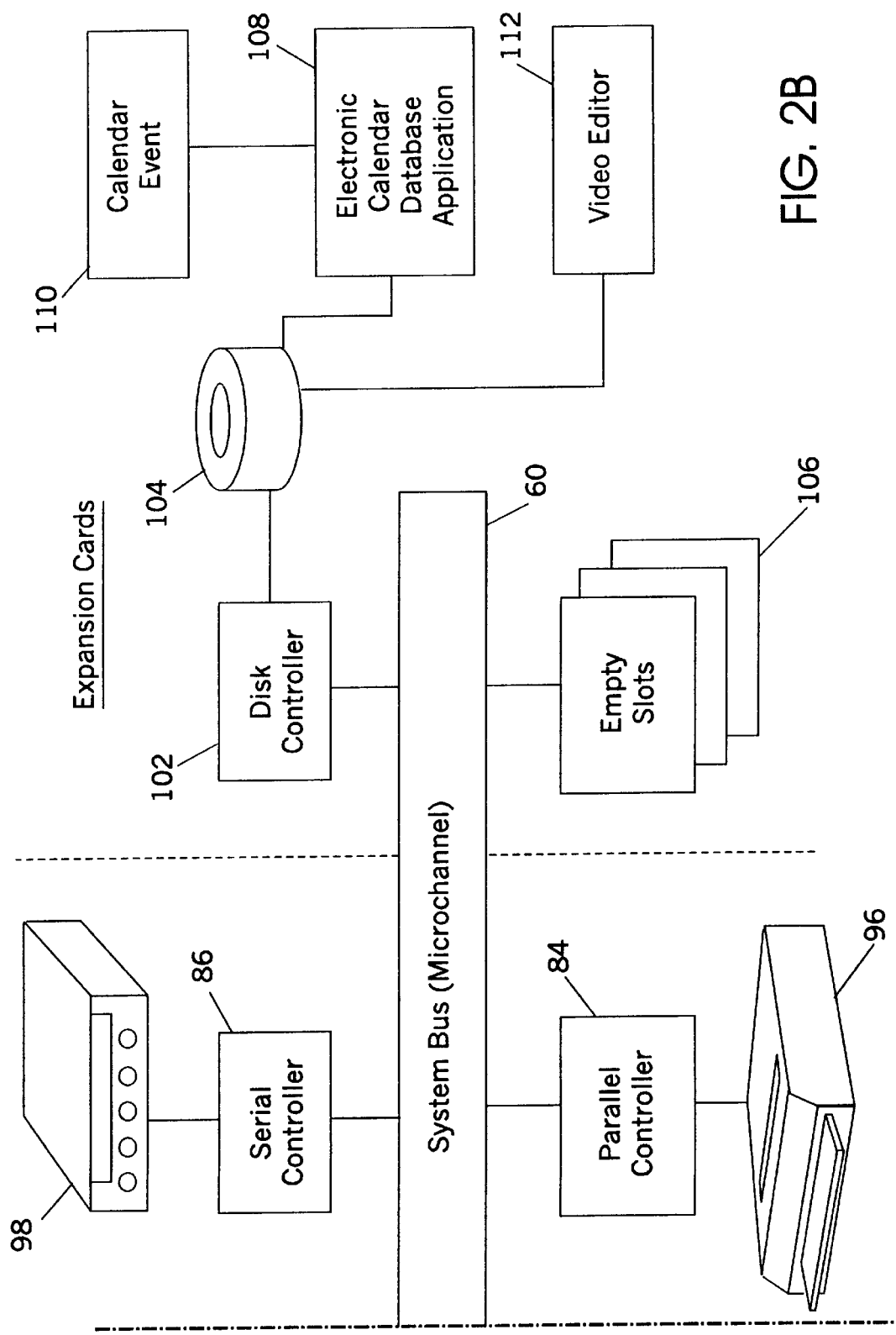
FIG. 2 depicts a block diagram of selected components in the data processing system illustrated in FIG. 1 in which a preferred embodiment of the present invention may be implemented.

Referring now to FIG. 2, there is depicted a block diagram of selected components of the system unit 52 of the personal computer 50, in which a preferred embodiment of the method of the present invention may be implemented. System unit 52 preferably includes a system bus 60 for interconnecting and establishing communication between various components of system unit 52. A microprocessor, such as an 80386 microprocessor 62, is connected to system bus 60. A numeric coprocessor, such as an 80387 coprocessor 64, may be connected to microprocessor 62. Alternatively, a microprocessor such as an 80486DX may be used in lieu of microprocessor 62 and coprocessor 64. System bus 60 may be a Micro Channel system bus from IBM Corp. "Micro Channel" is a registered trademark of IBM Corp. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard 56. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78, which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for the keyboard 56 and the mouse 58. Video controller 82 provides a hardware interface for the video display monitor 54. Parallel controller 84 provides a hardware interface for devices such as a printer 96. Serial controller 86 provides a hardware interface for devices such as a modem 98. Diskette controller 88 provides a hardware interface for a floppy disk unit 100.

Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming devices and the like also may be utilized in addition to or in place of the hardware depicted.

In accordance with the present invention, the data processing system 52 is provided with an electronic calendar database application 108 such as Time and Place/2, a trademark of IBM Corp., from IBM Corp. This application, called an electronic calendar or simply a calendar, may be stored on hard disk unit 104 and may be executed by the data processing system 52. The calendar database allows the user, or other persons having access to the calendar database, to record calendar events 110 to the user's electronic calendar for various times throughout the day or on various days. The user, or other persons having access, can later recall and view the events.

In accordance with the present invention, the data processing system 52 is also provided with a video editor application 112 such as Video Blaster from Creative Technology Ltd. The video editor may also be stored on hard disk unit 104 and may be executed by the data processing system 52. The video editor will display a full motion multimedia video and audio presentation to the user. It will accept the selection of a beginning point and an ending point within the presentation and prepare a video clip object of the video frames and associated audio information between the beginning point and ending point. The video clip object may be prepared either by creating a separate file containing the necessary video and audio information or by using pointers to the original multimedia presentation displayed.

Figure 3A:
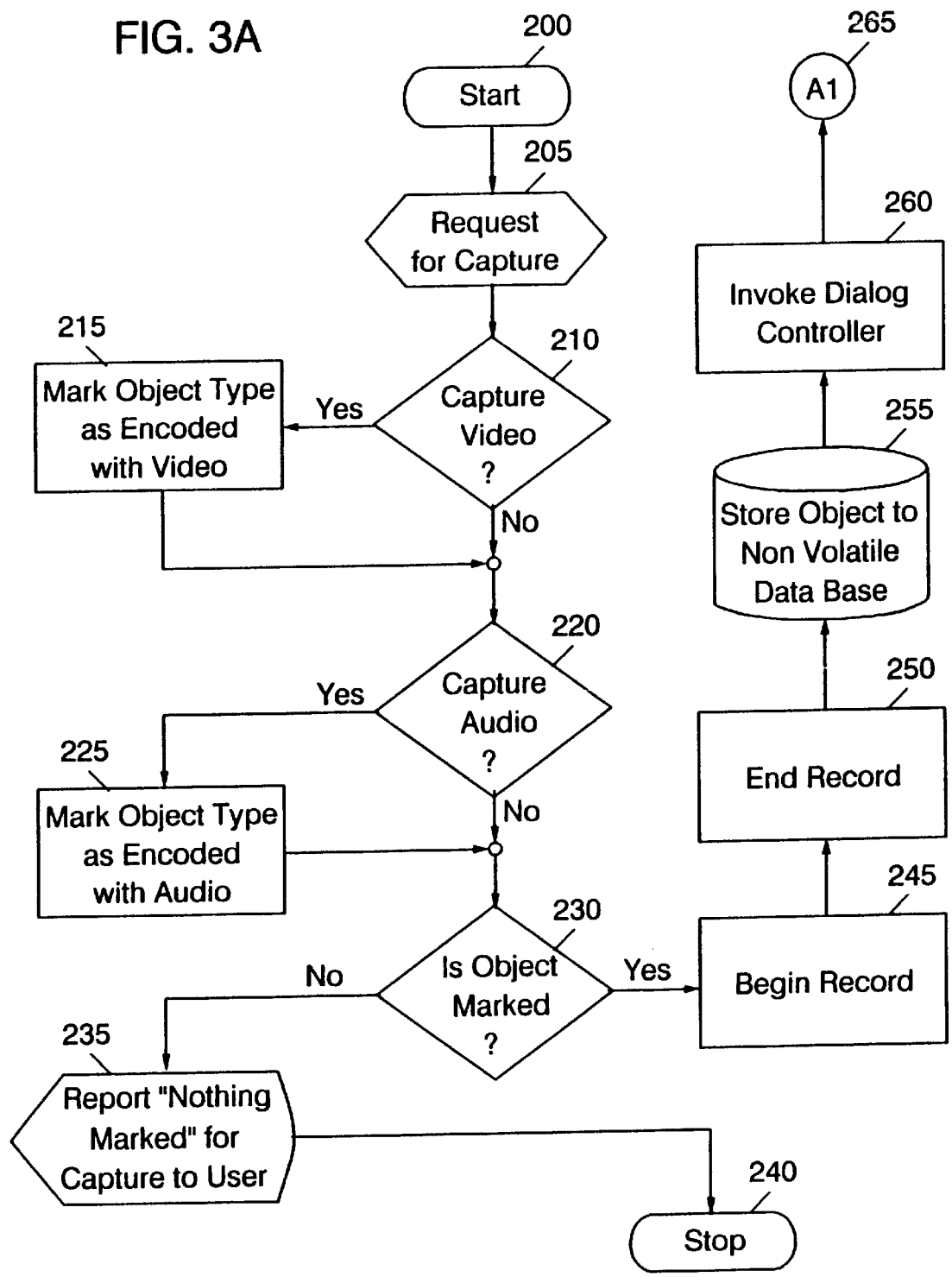
FIGS. 3A, 3B and 3C depicts a high level flow chart of a method and system for activation of regions of interest within a full motion video presentation and association to an electronic calendar event in accordance with a preferred embodiment of the present invention.
Figure 3B:
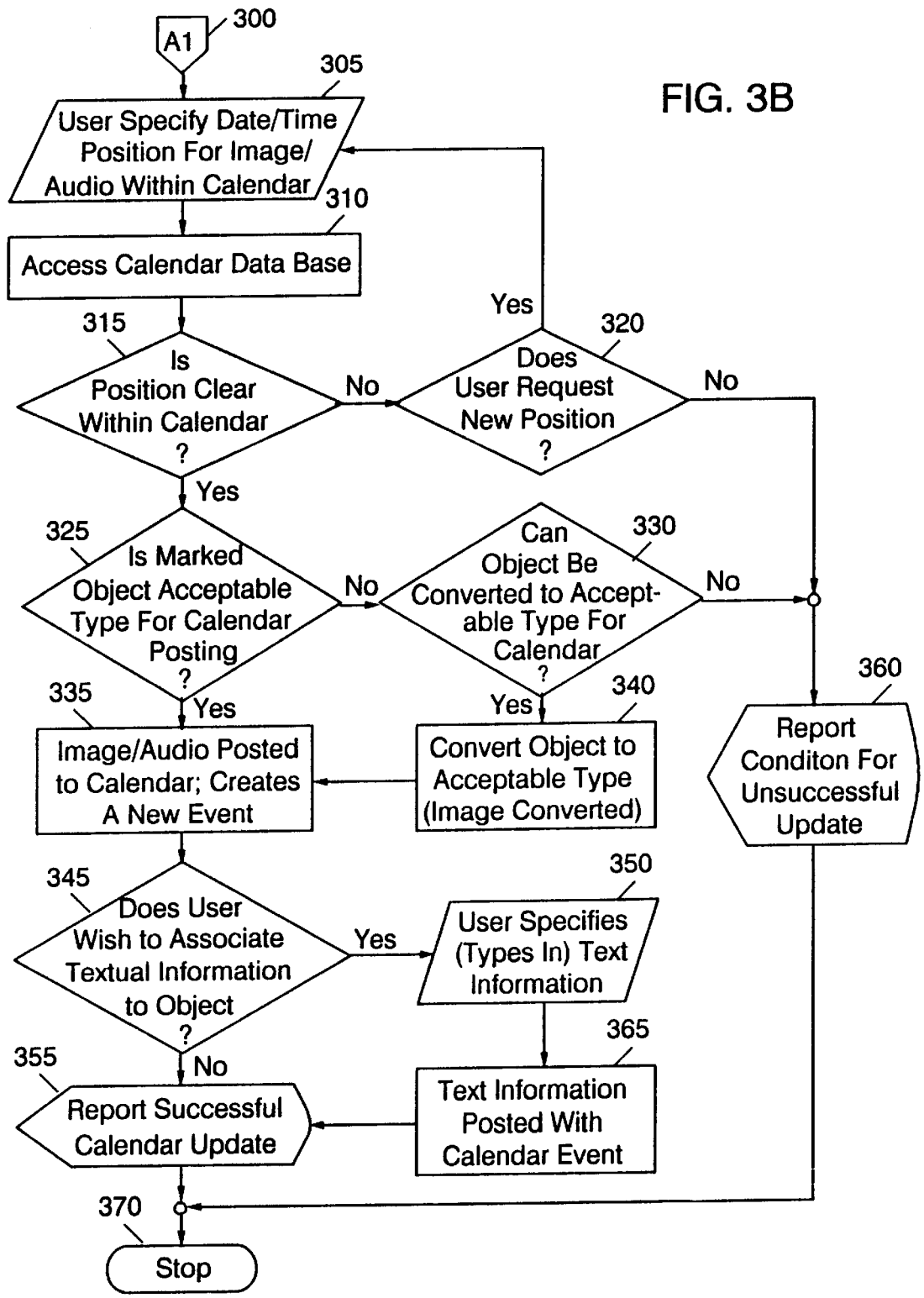

FIGS. 3A and 3B depicts a high level flowchart of a method and system for the capture and association of regions of interest within a full motion video presentation, in accordance with a preferred embodiment of the present invention. The process begins as illustrated in block 200 and thereafter proceeds to block 205, which depicts an invocation of a user requesting the capture of a specific duration of information for associating to a calendar event. As those skilled in the art can attest, methods of invocation can include specific keyboard sequences, mouse manipulation, touch screens, voice recognition systems and a plurality of input devices.

The user may enter the capture request during the full motion video presentation at the beginning of the portion of the presentation to be captured. The duration may be specified in seconds, minutes or number of frames, or alternatively, enter a second request at the end of the desired portion. The portion to be captured may also be identified by identifying the beginning and ending points by frame number or elapsed time. The beginning or ending point may also be entered by specifying an offset, in time or frames, from a specified point. Alternatively, either a beginning or an end point may be specified, together with a duration in either time or number of frames.

The process may be applied to any full motion video presentation that is available to or being received by the data processing system 52, including prerecorded presentations such as are available, for example, on compact disc-read only memory (CD-ROM), real-time video such as is presented by multimedia videoconferencing, and even broadcast or prerecorded television signals. Upon the designation of the beginning and ending points of the portion to be captured, a video editor is used to isolate the video frames and associated audio information within the portion to be captured as a separate video clip object.

Thereafter, the process proceeds to block 210, which determines whether the user requested that a video component of the information be captured for association to a calendar event. If association of the video information with a calendar event was requested, then the process continues to block 215, which marks the object as containing video image. This marking process initializes attributes of the object to be encoded as containing video information. The process then proceeds to process block 220. If the user did not request the capture of video information, as determined in process block 210, the process also proceeds from block 210 to process block 220.

Process block 220 illustrates a determination of whether the user requested that an audio component of the information be captured for association to the calendar event. If the association of audio information with the calendar event was requested, then the process continues to process block 225, where the process marks the object as containing audio information. Process block 225 is a process for initialization of attributes of the object to be encoded as containing audio information. Those skilled in the art can appreciate that process blocks 210 and 220 permit users to record either the video aspect or the audio aspect of a given communication session or the combination of both the video and the audio simultaneously.

Now referring to process block 225 the process continues to process block 230, which determines whether the object is marked for association to video or audio information to a calendar event. Referring to process block 220, if the user did not request an audio association, the process continues to process block 230. If process block 230 determines the object is not marked for association to either video or audio information, the process continues to process block 235, which notifies the user that no association exists for the object. The process then continues to process block 240 where the process terminates. Returning to process block 230, if the object has a marked designation for either audio or video or both, then the process continues to process block 245 where the user makes a request to record the communication session.

As previously stated, a plurality of input mechanisms may be employed by a user to request the recording, e.g., keyboard, voice recognition, mouse, touch screen, etc. Process block 245 begins recording a media as specified in process block 210 and 220. Thereafter, the process continues from process block 245 to process block 250 where the user may request to end recording the information specified communication session.

Those skilled in the art recognized that a user may request to abort the process during the record mode. The record mode specifies the duration of time between process block 245 and process block 250. Thereafter, the process stores the recorded information in a non-volatile storage data base as illustrated in process block 255. The recorded information may be stored on a plurality of devices, as illustrated in FIG. 2, such as a floppy disk unit 100 or hard drive unit 104. After storing the recorded information as an object in process block 255 the process continues to process block 260 where the process invokes a dialogue controller to associate the object to a calendar event. The dialogue controller prompts the user to enter specific information to access the electronic calendar. The process then continues to process block 265 which acts as a continuation reference for the off-page symbol continued on process block 300 of FIG. 3B.

The process continues from process block 300 to process block 305, in which the user specifies the date and time where the associated object should be positioned within an electronic calendar. Thereafter, the process continues to process block 310 where the calendar data base is queried to access information on the date and time specified by the user in process block 305. After accessing the electronic calendar in process block 310, the process continues to process block 315 which determines whether the date and time selected by the user is an available time slot on the calendar. An available time slot defines a point in time not occupied by any calendar event or which does not conflict with any other calendar event requesting a portion of the requested allocated time. If the time slot is not available, the process continues to process block 320 where the user has the option to select an alternative time slot.

If the user desires to select an alternative time slot the process proceeds again to process block 305. If the user does not request a new time slot the process proceeds to block 360 where the process reports the condition of the calendar association to the user. Those skilled in the art recognize that this condition can be conveyed via video display terminal, 54 or via logging the condition to non-volatile storage, such as a diskette, 100 or hard drive, 104. Additionally, other types of volatile storage, such as RAM, 70, may also be utilized, in accordance with a preferred embodiment of the present invention. After reporting the unsuccessful condition in process block 360 the process continues to process block 370 which terminates the process.

If process block 315 determines that the selected time position is available, then the process continues from process block 315 to process block 325, which determines whether the calendar can accept the specified media for association. The process determines the type of specified media by examining the attributes of the marked object as designated in process block 215 and 225.

If process block 325 determines that the object is not of an acceptable type or media, then the process continues to process block 330 which determines if the object can be converted into an acceptable type. If the object cannot be converted, the process proceeds to process block 360, where the process reports the condition of the calendar association to the user. After reporting the unsuccessful condition due to the inability to convert the object, the process continues to process block 370 which terminates the process.

Returning to process block 330, if it is determined the object can be converted, the process continues to process block 340, for the appropriate conversion. After preforming the conversion in process block 340, the process continues to process block 335 which associates the object to the specified event. This process allows the user to view and hear the object in reference to an electronic event.

Returning to block 325, if process block 325 determines that the object is already in an acceptable format, then the process again continues to process block 335. After associating the object to a calendar event as illustrated in process block 335 the process continues to process block 345, which determines whether the user desires to associate textual information with the object.

Those skilled in the art can appreciate that this process allows the user to establish supplemental information on the association which can additionally be viewed or utilized for search queries in the calendar data base. If the user elects to associate textual information, then the process continues from process block 345 to process block 350 where the user inputs the textual information. Thereafter, the process continues to process block 365, which associates the textual information to the calendar event. Thence, the process continues to process block 355 which informs the user of the calendar update.

Returning to block 345, if the user does not elect to associate textual information with the object, as determined in process block 345, the process continues directly from 345 to process block 355, which informs the user of the successful condition of the calendar update. From process block 355, the process continues to process block 370 which terminates the process.

Figure 3C:
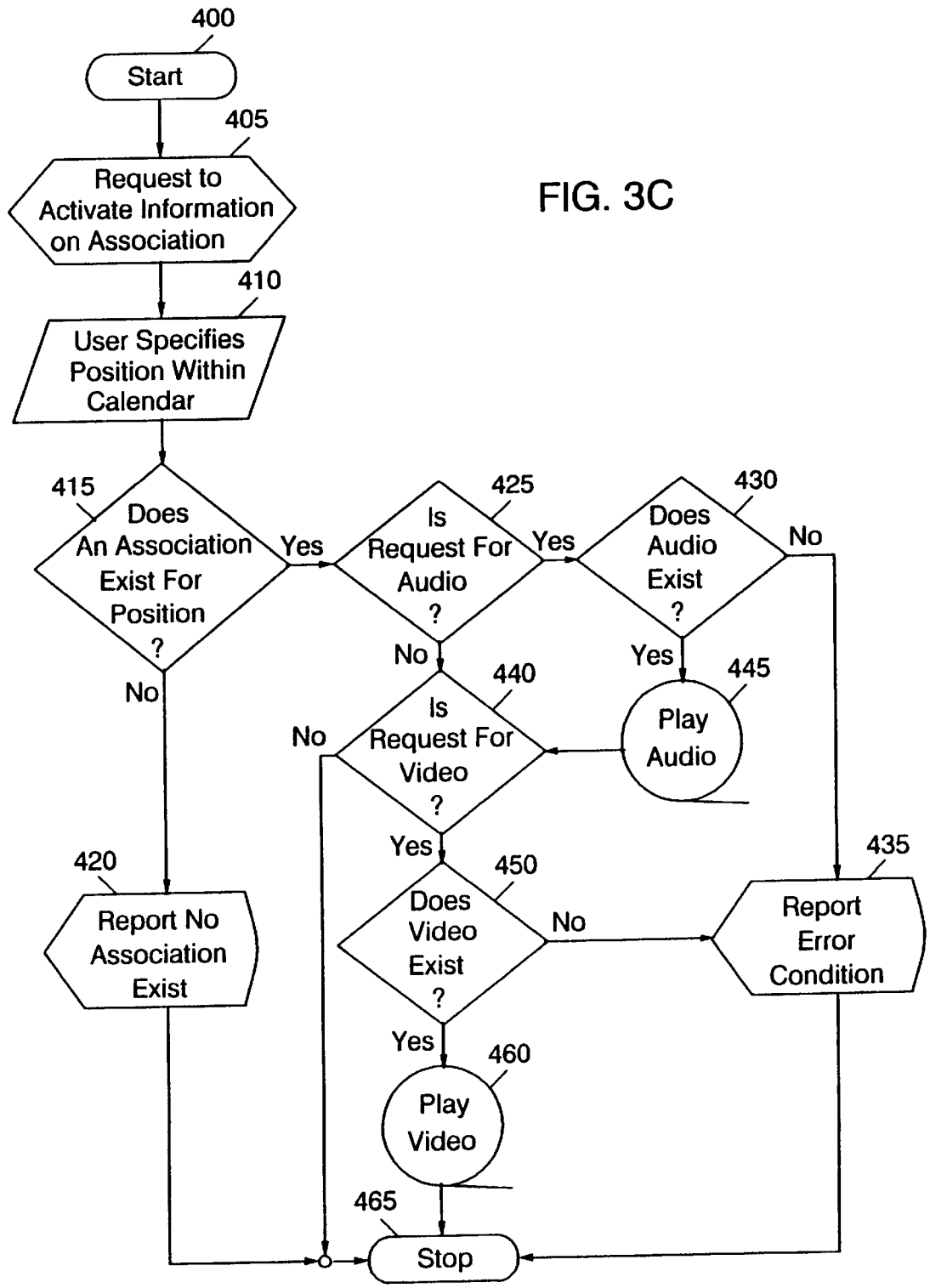

FIGS. 3C depicts a high level flowchart of a method and system for playing components within a full motion video presentation associated with a calendar event, in accordance with a preferred embodiment of the present invention. The process begins as illustrated in process block 400 and thereafter proceeds to process block 405, which depicts an invocation of a user requesting to listen or view specified information in accordance with a previously associated calendar event as depicted in FIGS. 3A and 3B. After receiving the request in process block 405, the process proceeds to process block 410 where the user specifies the calendar position of the association. The calendar position is the date/time slot of a calendar event. Thereafter, the process continues to process block 415, which determines if an association of captured video or audio exists at the specified calendar position. If an association does not exist the process proceeds to process block 420, which notifies the user of the lack of an association, and the process continues to process block 465 where the process terminates.

If process block 415 determines that an association does exist, the process continues to process block 425 which determines whether the user desires to be conveyed the audio component of the association. If the user desires to be conveyed the audio component of the association, then the process continues to process block 430 which determines whether audio existed for the association. The process determines the existence of audio by examination of the object's attributes as specified in FIG. 3A process block 225.

If audio does not exist as determined in process block 430, then the process proceeds to process block 435, which notifies the user that the request to convey audio cannot be processed. Thereafter, the process continues to process block 465 which terminates the process.

If process block 430 determines that audio exists, the process then continues to process block 445 which activates the specified audio device. The process then continues to process block 440 which determines whether the video component association should be played. Those skilled in the art recognized that the request for audio and video can be synchronized by the timing of the request. This approach allows the user to listen to full motion video in its entirety with sound and motion.

If process block 425 determines the user has not requested to listen to audio information, the process continues to process block 440. If process block 440 determines there is no request to present video information then the process continues to process block 465 which terminates the process.

If process block 440 determines the request is to convey video information of the association, then the process proceeds to process block 450 which determines if the video component exists within the association. If the video association does not exist, then the process proceeds to process block 435 which reports the condition to the user. Thereafter the process continues to process block 465 which terminates the process.

If process block 450 determines that the video component of the association exists, then the process proceeds to process block 460 which activates the video information for viewing for the user. As those skilled in the art can appreciate, the timing of video and audio request can be simultaneous, i.e., two instances of process flow FIG. 3C being executed simultaneously for the video and the audio associations on a single object. After playing the designated video association the process proceeds to process block 465, which terminates the process.

While the invention has been particularly shown and described with reference to a preferred embodiment and process, it will be understood by those skilled in the art that various changes in form and detail may be made therein without departing from the spirit and scope of the invention.

What is claimed is:

1. A method, performed in a data processing system, for selectively capturing information from a multimedia presentation within a data processing system, said data processing system including a calendar, said method comprising the computer implemented steps of:

selecting information from a multimedia presentation within the data processing system;

designating a calendar event of a calendar within the data processing system; and associating said selected information to the designated calendar event within the data processing system.

2. The method of claim 1 wherein said information selected from said multimedia presentation includes a plurality of frames of video information selected from said multimedia presentation.

3. The method of claim 1 wherein said information selected from said multimedia presentation includes audio information selected from said multimedia presentation.

4. The method of claim 1 wherein said information selected from said multimedia presentation includes both a plurality of frames of video information selected from said multimedia presentation and also audio information from said multimedia presentation that is associated with said plurality of frames of video information.

5. The method of claim 1, further comprising the computer implemented step of playing back said information associated to said designated calendar event in response to the subsequent selection of said designated calendar event.

6. The method of claim 1, further comprising the computer implemented step of storing said information from said multimedia presentation within said data processing system.

7. The method of claim 1, further comprising the computer implemented step of associating textual information to said information from said multimedia presentation associated with said designated calendar event.

8. The method of claim 1 wherein the computer implemented step of selecting information from a multimedia presentation within the data processing system includes the computer implemented step of specifying at least two of: a beginning point, an ending point, and a duration of the multimedia presentation.

9. A data processing system, for selectively capturing information from a multimedia presentation within a data processing system, said data processing system including a calendar, comprising:

means for selecting information from a multimedia presentation within the data processing system;

means for designating a calendar event of a calendar within the data processing system; and means for associating said selected information to the designated calendar event within the data processing system.

10. The data processing system of claim 9 wherein said information selected from said multimedia presentation includes a plurality of frames of video information selected from said multimedia presentation.

11. The data processing system of claim 9 wherein said information selected from said multimedia presentation includes audio information selected from said multimedia presentation.

12. The data processing system of claim 9 wherein said information selected from said multimedia presentation includes both a plurality of frames of video information selected from said multimedia presentation and also audio information from said multimedia presentation that is associated with said plurality of frames of video information.

13. The data processing system of claim 9, further comprising means for playing back said information associated to said designated calendar event in response to the subsequent selection of said designated calendar event.

14. The data processing system of claim 9, further comprising means for storing said information from said multimedia presentation within said data processing system.

15. The data processing system of claim 9, further comprising means for associating textual information to said information from said multimedia presentation associated with said designated calendar event.

16. The data processing system of claim 9 wherein means for selecting information from a multimedia presentation within the data processing system includes means for specifying at least two of: a beginning point, an ending point, and a duration of the multimedia presentation.

* * * * *